United States Patent [19]

Arnason

[11] 4,239,808
[45] Dec. 16, 1980

[54] IN-MOLD COATING OF SHEET MOLDING COMPOUND MOLDINGS

[75] Inventor: Sigurdur I. Arnason, Fenwick, Mich.

[73] Assignee: The General Tire & Rubber Company, Akron, Ohio

[21] Appl. No.: 48,305

[22] Filed: Jun. 13, 1979

Related U.S. Application Data

[63] Continuation of Ser. No. 814,502, Jul. 11, 1977, abandoned.

[51] Int. Cl.$^3$ .............................................. B29C 5/00
[52] U.S. Cl. ................................... 428/482; 264/250; 264/255; 427/393.5; 428/63; 428/413; 428/483
[58] Field of Search .................... 264/134, 250, 255; 260/37 R; 428/482–483, 63, 413; 427/393.5

[56] References Cited

U.S. PATENT DOCUMENTS

| | | | |
|---|---|---|---|
| 3,066,112 | 11/1962 | Bowen | 260/42.15 |
| 3,179,623 | 4/1965 | Bowen | 260/37 EP |
| 3,256,226 | 6/1966 | Fekete et al. | 260/22 EP |
| 3,301,743 | 1/1967 | Fekete et al. | 260/40 R |
| 3,367,992 | 2/1968 | Beardon | 260/37 R |
| 3,466,259 | 9/1969 | Jernigan | 260/37 R |
| 3,793,398 | 2/1974 | Hokamura | 525/65 |
| 3,836,600 | 9/1974 | Brewbaker et al. | 260/40 R |
| 4,010,289 | 3/1977 | Kobayashi et al. | 42/54 |
| 4,081,578 | 3/1978 | Vanessen | 428/63 |

OTHER PUBLICATIONS

Randolph et al, Plastics Engineering Handbook, Reinhold N.Y. (1960) pp. 218-220.

Primary Examiner—Jeffery R. Thurlow

[57] ABSTRACT

Liquid compositions suitable for hot post-mold coating of cured sheet molding compound (SMC) parts comprise a reaction product of an epoxide and an unsaturated carboxylic acid mixed with a low shrink additive. These liquid compositions are used to smooth surfaces, fill porosity and other voids and to eliminate or reduce sink marks. Coatings typically are cured in less than two minutes and appear able to provide many features of normal painting without paint facilities except possibly those needed for touch-up.

The application method used to date has been to compression mold an SMC part in the usual way, separate the mold halves, inject the liquid composition and re-close the mold for a second cure cycle. A unique feature of the liquid composition is its ability to adhere to an uncleaned SMC molding.

3 Claims, No Drawings

IN-MOLD COATING OF SHEET MOLDING COMPOUND MOLDINGS

This is a continuation, of application Ser. No. 814,502 filed July 11, 1977 now abandoned.

BACKGROUND OF THE INVENTION

1. Field of the Invention

The present invention relates to an in-mold coating process for applying coatings to moldings made of sheet molding compounds.

2. Description of the Prior Art

SMC is widely used for high-volume moldings of large, rigid parts. Factors favoring this use have been fast cure and easy flow of the SMC, high strength and stiffness, smoothness, low shrinkage, dimensional stability, and relatively low cost. However, still further improvement in surface quality for exterior automotive parts is a major need.

Particularly troublesome are surface porosity, waviness and sinks. None of these are effectively filled or masked by normal painting operations. Therefore, it is customary to inspect all parts and recycle defective ones through handfilling, sanding, painting and inspection stations until acceptable appearance is obtained. Where no sink can be tolerated, it is common to mold a separate part to act as a skin and bond to it a second part with stiffening and fastening sections.

Other approaches have been to mold a gel coat on parts to hide substrate flaws. In principle, this is done either by coating the hot mold before a charge is molded, see U.S. Pat. No. 3,940,468 (copy enclosed), or by molding a gel coat on a previously-molded part, see Japanese application 34210/62 (partial translated copy enclosed).

None of the above described methods of gel coating other than the urethane, appears to have received significant testing in hot matched metal SMC molding for a variety of reasons. Probably, the major technical obstacle has been lack of coatings which adhere to SMC other than through co-cure. Thus, where such coatings are applied first, the coating must be cured enough to resist tear during flow of the SMC but still be undercured enough to cross-link with the SMC. Similarly, when the SMC is molded first, it is necessary to open the mold before the SMC is fully cured, which is generally impractical since thin sections of parts are cured long before thick sections are adequately hardened.

One way around the problems described has been the use of resin impregnated foils in place of gel coatings. Another method has been use of unimpregnated foils which act as a tiecoat into whose opposite sides first SMC and later a gel coat can bite. The outstanding benefit with both methods is the ability to obtain surfaces with printed patterns. However, the utility is limited by folding or tearing of foil on many nonflat parts.

Another method has been to bond the gel coat to the substrate through isocyanate reactivity using a two component gel coat. The two part systems require mixing control, see British Pat. No. 1,457,935.

SUMMARY OF THE INVENTION

In view of the above difficulties, liquid compositions were sought which could be molded on and which would adhere to cured SMC parts. As a result of this work, coatings were found which could be molded onto SMC parts. The coatings process used is to conventionally compression mold an SMC part, separating the mold half, retaining a seal between the shear edge formed by the upper sides of the mold extending below the upper edge of the top of the lower mold half. The gel coat is then injected and the mold is closed to flow and cure the coating. The coatings injected do not require mixing of reactive components at the time of or immediately prior to the time of injection. The coatings of the present invention are also cheaper than the prior art isocyanate coatings. The coatings can also be applied to cured SMC parts.

In order to obtain coatings having the physical properties desired by the automobile manufacturers without the disadvantages of the prior art coating compositions, a mixture of two components, generally in a vinyl monomer solvent, are required.

The first component is a vinyl ester resin. The second component is a material which is incompatible with the vinyl ester resin. Materials commonly used as low shrink additives meet this requirement. It is believed that the low shrink additive weakens the tensile strength of the coating so it cannot be pulled off in one piece or transmit forces. Based on 100 parts of vinyl ester resin, the low shrink additive is present at a level of from 10 to 50 parts, preferably from 20 to 40 parts by weight. Both the vinyl ester and the low shrink additive are normally dissolved in styrene.

Vinyl ester resins are generally prepared by reacting about equivalent proportions of a polyepoxide resin and an unsaturated monocarboxylic acid wherein

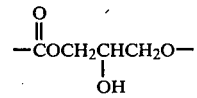

linkages are formed and the resulting resin has terminal, polymerizable unsaturated groups. For example, two equivalents of methacrylic acid may be reacted with two equivalents of a polyepoxide resin to produce a vinyl ester resin.

Vinyl ester resins are described in U.S. Pat. No. 3,367,992 to Bearden wherein dicarboxylic acid half esters of hydroxyalkyl acrylates or methacrylates are reacted with polyepoxide resins. Bowen in U.S. Pat. Nos. 3,066,112 and 3,179,623 describes the preparation of vinyl ester resins from monocarboxylic acids such as acrylic and methacrylic acid. Bowen also describes an alternate method of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al, Fekete et al also describe in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as an amine, mercaptan and the like, may be utilized in place of the dicarboxylic acid. All of the above-described resins which contain the characteristic linkages

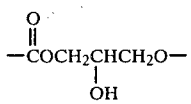

and terminal, polymerizable unsaturated groups are classified herein as vinyl ester resins. The preparation of vinyl ester resins is fully disclosed in the above patents.

Additionally, it is meant to include within the definition of vinyl ester resins those resins wherein the secondary hydroxyl group formed by the interaction of an epoxide group with a carboxylic acid group has been reacted with a dicarboxylic acid anhydride to produce pendant carboxylic acid groups. The preparation of these materials is described in U.S. Pat. No. 3,466,259 to Jernigan. A variety of saturated and unsaturated anhydrides similar to those described as useful in preparing polyester resins may be used in proportions of at least about 0.1 mole of anhydride per equivalent of hydroxyl group up to an amount sufficient to react with each hydroxyl. A reaction temperature from about 25° to 150° C. is suitable and any of the well known vinyl polymerization inhibitors may be added to prevent polymerization during the reaction.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bis-phenol A, epoxy novolacs, epoxidized fatty acids or drying oil acids, epoxidized diolefins, epoxidized diunsaturated acid esters as well epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2,000. These polyepoxides are usually made by reacting at least about 2 moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group per molecule, i.e., a 1,2-eopxy equivalency greater than one.

Unsaturated monocarboxylic acids include acrylic acid, methacrylic acid, halogenated acrylic or methacrylic acids, cinnamic acid and the like and mixtures thereof, and hydroxyalkyl acrylate or methacrylate half esters of dicarboxylic acids as described in U.S. Pat. No. 3,367,992 wherein the hydroxyalkyl group preferably has from two to six carbon atoms.

Useful dicarboxylic acid anhydrides to modify the vinyl ester resin include unsaturated anhydrides such as maleic anhydride, citraconic anhydride, itaconic anhydride, the various substituted maleic anhydrides and the like, as well as a variety of saturated anhydrides such as phthalic anhydride, chlorendic anhydride, tetrabromophthalic anhydride and the like.

A variety of copolymerizable monomers are available and suitable and include alkenyl aromatic monomers, alkyl esters of acrylic and methacrylic acid, vinyl acetate, acrylonitrile, diallyl maleate, diallyl phthalate, acrylic and methacrylic acid, and the like and mixtures thereof. Preferred are the alkenyl aromatic monomers such as styrene, α-methyl styrene, vinyl toluene, alkyl substituted styrenes such as t-butyl styrene, etc., halogen substituted styrenes such as chlorostyrene, dichlorostyrene and the like.

The preferred low shrink additive or film weakening additive is polyvinyl acetate. Polyvinyl acetate copolymers can also be used.

The thermoplastic polymers of vinyl acetate suitable for purposes of this invention contain an average of 0 to about 10 and preferably an average of 0 to about 3 carboxyl groups per molecule. On a weight basis, suitable thermoplastic polymers contain about 0 to about 5 percent by weight, preferably about 0 to about 2 percent by weight combined "carboxyl" compound. These polymers can be prepared in a number of ways, all well known in the art, by:

(1) Polymerizing vinyl acetate with a copolymerizable carboxylic acid to produce a copolymer having an average of at least one carboxyl group per molecule. Suitable copolymerizable carboxylic acids are the unsaturated polycarboxylic acids previously described as well as unsaturated monocarboxylic acids having the formula:

$$C_\alpha H_{2\alpha-2} O_2$$

wherein α is an integer having a value of 3 to 10 inclusive, preferably 3 to 6 inclusive. Exemplary of acids falling within the scope of the above are the following: acrylic acid, methacrylic acid, crotonic acid, isocrotonic acid, vinyl acetic acid, tiglic acid, hexenic acid, and the like.

(2) Reacting poly(vinyl acetate) with a copolymerizable carboxylic acid, such as the acids described in (1) above to form a block copolymer or a grafted copolymer.

(3) Partially hydrolyzing poly(vinyl acetate) generally to a maximum value of 20% based on the total number of ester groups originally present and partially or totally esterifying the hydroxyl groups with a polycarboxylic acid or anhydride thereof as previously described in this specification.

(4) Preferably the vinyl acetate is a homopolymer. In formulating the compositions of this invention, it is customary to admix with the polymers of vinyl acetate, a polymerizable ethylenically unsaturated monomer, which serves to cross-link the vinyl ester resin to a thermoset product. Vinyl monomers have the formula:

$$CH_2{=}CH{-}R$$

wherein R is a group having an unsaturated carbon-to-carbon, carbon-to-oxygen or carbon-to-nitrogen group in conjugation with the vinyl group. Groups having such unsaturation in conjugation with the vinyl group are aryl, ketonic, heterocyclic, nitrile, carbalkoxy, carboxy and amido.
Specific vinyl monomers include the following:
wherein R is aryl: styrene, halogenated styrenes such as chlorostyrene, p-iodostyrene, m-fluorostyrene, di-chlorostyrene and the like; alkyl substituted styrenes such as p-methyl styrene, p-ethyl styrene, o-tert-butyl styrene and the like; alkoxy and aryloxy substituted styrenes such as p-ethoxy styrene, p-propoxy styrene, p-phenoxy styrene and the like;
wherein R is ketonic: ethyl vinyl ketone, n-propyl vinyl ketone, phenyl ketone and the like;

wherein R is heterocyclic: vinyl pyridine, vinyl quinoline, vinyl pyrrole, vinyl carbazole, vinyl thiophene and the like;

wherein R is nitrile: acrylonitrile and the like;

wherein R is amido: acrylamide, bicycloheptylacrylamide, diacetoneacrylamide and the like;

wherein R is carboxy: acrylic acid and the like;

wherein R is carbalkoxy: methyl acrylate, butyl acrylate, octyl acrylate, lauryl acrylate, cyclohexyl acrylate, phenyl acrylate, benzyl acrylate and the like.

Also suitable is diallylphathalate and the like.

The amount of ethylenically unsaturated monomer used can vary over wide limits. For example, the monomer can be used in amounts of about 10 to about 60% by weight based on the combined weight of the monomer and the polyvinyl acetate. It is preferred to used about 20 to about 50% by weight ethylenically unsaturated monomer, based on the combined weight of the monomer and polyvinyl acetate. The same unsaturated monomers can be used as solvents for the other low shrink additives and the vinyl ester resin. The unsaturated monomer is usually present at a level of from 50 to 400 parts and preferably 100 to 200 parts based upon 100 parts of vinyl ester resin. Preferably from 1 to 3 equivalents of vinyl monomer per equivalent of vinyl ester unsaturation are present.

Other preferred low shrink additive includes the polydiene rubbers. By polydiene rubbers it is meant to include herein homopolymers and copolymers of conjugated diene monomers such as butadiene. It is further contemplated within this definition to include polymers containing at least about 30 weight percent of diene monomer with the balance comprising at least one other copolymerizable monomer such as styrene or acrylonitrile. It is also meant to include random, graft and block polymers of which a wide variety are commercially available or readily prepared by known polymerization methods.

While polydiene rubbers with as little as 30 weight percent of a diene monomer provide improvements according to this invention better coating properties are found when the diene monomer constitutes at least about 40 weight percent of the polymer and polymers at or above this level are preferred for this invention.

Conjugated diene monomers include butadiene, isoprene, chloroprene, the various halo and lower alkyl substituted derivatives thereof and the like monomers. Mixtures of said diene monomers are frequently used to impart certain desired properties to the polydiene rubbers. Polybutadiene is a preferred polydiene.

Copolymerizable monomers useful with said diene monomers include nitrile monomers such as acrylonitrile, methacrylonitrile and the like and alkenyl aromatic monomers such as styrene, α-methyl styrene, vinyl toluene, the halo and alkyl substituted styrenes such as chlorostyrene or t-butyl styrene. Preferred copolymers include styrene-butadiene copolymers and especially block copolymers thereof.

The unsaturated polydiene rubbers of this invention may be prepared by a variety of well known procedures, and since this invention is concerned with the utilization of said rubbers and not their preparation, no detailed description thereof is needed. Many textbooks and patents are readily available which can be consulted for such preparative methods, such as the chapter on butadiene polymers and copolymers by W. Saltman in "Encyclopedia of Polymer Science and Technology", Vol. 2, Interscience Publishers, 1965.

The preferred polydiene rubber has an inherent viscosity of about 0.3 to 1.2 deciliters/gram or a molecular weight of at least about 15,000 to 20,000.

Improvement in coating properties appear to be related to molecular weight of the polydiene rubber. Consequently higher molecular weight polydiene rubbers when used at the lowest concentration shows greater improvement than the lower molecular weights. Accordingly, it is preferred to use polydiene rubbers having a viscosity of at least about 0.5 deciliters/gram.

Advantageously, it has been found that the viscosity range can be extended upward to about 2 deciliters/gram if the system also contains at least about 15 parts of an inert filler such as clay and the like per 100 parts of resin and rubber. This is of particular significance because thermosettable resin systems are usually formulated with such fillers in commercial use in order to impart certain properties such as weatherability, etc. and for reason of economics.

Inherent viscosity is defined as follows:

$$\eta\text{inh} = (2.303 \log_{10} \eta r)/(C)$$

where
$\eta r = (\eta/\eta)$ and
$\eta$ = time for solvent and
$\eta$ = time for a solution of 0.15 gm of polymer/100 ml of toluene
C = concentration The viscosity units are in deciliters/gram Other low shrink additives which can be used include polymethylmethacrylate, polyethylene and polystyrene.

In addition to the vinyl ester resin, an unsaturated polyester resin can optionally be present. The polyester is present at a level of from 0 to 100 parts of vinyl ester resin by weight.

Generally, in the preparation of suitable polyesters, an ethylenically unsaturated dicarboxylic acid such as maleic acid, fumaric acid, itaconic acid or the like, is interesterified with an alkylene glycol or polyalkylene glycol having a molecular weight of about 1,000 to 8,000 or thereabouts. Frequently, dicarboxylic acids free of ethylenic unsaturation such as phthalic acid, isophthalic acid, tetrabromophthalic acid, chlorendic acid, adipic acid, succinic acid and the like may be employed within a molar range of 0.25 to as much as 15 moles per mole of the α,β-unsaturated dicarboxylic acid. It will be understood that the appropriate acid anhydrides when they exist may be used and usually are preferred when available.

The glycol or polyhydric alcohol component of the polyester is usually stoichiometric or in slight excess with respect to the sum of the acids. The excess of polyhydric alcohol seldom will exceed 20–25% and usually is about 2–10%.

These unsaturated polyesters may be generally prepared by heating a catalyzed mixture of the polyhydric alcohol with the dicarboxylic acid or anhydride in the proper molar proportions at elevated temperatures, usually at about 150° to 225° C. for a period of time ranging from about 5 to 15 hours. Polymerization inhibitors such as t-butyl catechol may be advantageously added. It is also possible to prepare unsaturated polyesters directly from the appropriate oxide by copolymerization with an anhydride, e.g., propylene oxide can be used in place of propylene glycol and copolymerized with maleic anhydride or a mixture of maleic anhydride and phthalic anhydride. Further description of these well known resins is unnecessary herein.

Normally, the gel coating composition of the present invention are dissolved or suspended in a vinyl monomer such as those described above in conjunction with the vinyl acetate. The vinyl monomer can be present at a level of from 10 to 200 and preferably 50 to 150 parts based upon 100 parts by weight of vinyl ester.

The usual emulsifier, inhibitors and fillers can also be present, see U.S. Pat. Nos. 3,466,259; 3,548,030; 3,564,074; 3,674,893; 3,836,600 and 3,683,045 for a complete disclosure of the above materials.

The preferred SMC's used in the practice of the present invention as substrates for in-mold coating are those based on vinyl ester, isophthalic and propylene glycol fumarate polyester systems.

Chrome-plated, shear edge molds suitable for compression molding SMC adequately contain and release in-mold coated parts. Ordinarily, molds are used whose surfaces part evenly when the press is opened. Furthermore, it must be noted that coating thickness varies with draft angle of substrate surface; thicknesses typically run from around 0.01 mm on low draft surfaces to 0.07 mm on high draft surfaces. This occurs because the mold opening available for coating when measured perpendicular to the part surface varies with the sine of the draft angle.

As mentioned earlier, the principal method so far used to apply coating is to slightly separate the mold halves, inject onto the SMC part and then reclose the mold. This method allows a shear edge design to form a liquid seal at all times.

Charge weights giving as much as 0.5 mm of coating have been used, but an average of 0.07 to 0.10 mm of coating has generally been enough to give both opacity and complete coverage. Since the usual SMC part averages 2.5 mm in thickness, a typical coating has required about 0.30 to 0.05 gm of coating per gm of SMC used.

Simple coating charge placements, often a single pool or strip formed by high pressure injection usually have provided complete coverage.

Mold temperatures from 140° to 160° C. have given satisfactory coatings. A minimum cure time of 10 to 30 seconds at 150° C. has been used and even slower cure rates have sometimes been required to prevent too rapid gelation and resulting incomplete coverage.

Higher molding pressures, as expected, provide better coverage of steeper, lower draft surfaces. However, the typical pressures needed to mold the base SMC part have also generally been adequate to give a complete coating.

The principal aim of gel coating has been to fill voids, reduce sinks and act as a replacement for the primer-sealer now commonly used by custom molders of SMC.

In-mold coated parts have appeared satisfactory by the automotive tests normally used except for the Ford Cross-Hatch Test. Results are still incomplete as to weathering. Gravelometer values have been particularly good with no separation of in-mold coating from substrate and little separation of paint from in-mold coating.

Although most work has been directed at replacing a priming operation, coatings have also been made which appear suitable as topcoats, at least, insofar as hiding power goes. Also coatings with good conductivity have been made by inclusion of suitable cokes. As this indicates, there is considerable flexibility in choice of ingredients and resulting coating properties.

In the following examples as elsewhere in the specification and claims, all parts and percentages are by weight unless otherwise specified.

EXAMPLE I

A 1976 Oldsmobile grile was molded using a standard Rohm and Haas unsaturated polyester based sheet molding compound. The part was cured in the press for 1¼ minutes at a mold temperature of 150° C. The top mold half was then raised 10 mm while maintaining a seal with the shear edge of the mold. The following gel coating composition was then injected for 3 seconds through a cooled injection nozzle positioned in the top surface of the mold. The coating was cured for ½ minute. A coating 0.13 mm thick was formed using 80 gms of the coating composition.

The coating composition used had the following formulation.

| Components | Parts |
| --- | --- |
| Vinyl ester resin[1] in styrene (believed to be 66% copolymer of acrylic acid and diglycidyl ether of bisphenol A in 44% styrene) | 400 |
| 40% polyvinyl acetate containing some carboxyl groups dissolved in 60% styrene[2] | 120 |
| $CaCO_3$ filler | 450 |
| Tertiary butyl peroctoate | 5 |
| Saturated solution of parabenzoquinone in styrene (inhibitor) | 0.6 |
| Dialkyl phosphate[3] (mold release) | 4.2 |

[1]Dow XD 9013.01
[2]Union Carbide LP 40
[3]Zelac NE DuPont

The coated grills were testing using the following Chrysler test procedures with the following results:
LP 463PD-15-01 ADHESION AND TOUGHNESS PASS REQUIRED TESTING: No separation of the paint film from the base substrate or coating. This test involves scoring the coating then taping with a special adhesive tape then removing the tape.
LP 463PD-9-01 CONDENSING HUMIDITY RESISTANCE TEST PASSED REQUIRED TESTING: No blistering or loss of adhesion due to condensing humidity. This test involves placing the part in a 100% humidity environment at 49° C. for 250 hours.
LP 463PD-22-01 CYCLE TESTING OF PAINTED SURFACES PASSED REQUIRED TESTING: Method II no blistering, checking, cracking, chipping, loss of adhesion, loss of color, or other effects detrimental to the surface. The test involves 15 heating and cooling cycles.

The coated grills were also subjected to the SAE J400 Gravelometer test with the following results: The test is performed at −18° C. by bombarding the part with gravel propelled by an air pressure of 483 KPa.
Chip Resistance (Gravelometer)
2—Panels (13) A-6C, B-6C, 7B,
2—Panels (14) A-7C, B-6B, 7C,
2—Panels (15) A-7B, B-9B.
Passed Required Testing—Rating of 4B or lower are failures.

The composition of Example I was used to coat SMC substrates based on Union Carbide, Ashland and Rohm and Haas formulations with equally good results. Substrate cure times can be varied from ninety seconds to six minutes while still retaining an acceptable product. The substrates coated included Oldsmobile hoods having a top surface area of 2.3 square meters with good results.

EXAMPLE II

Example I was repeated with the exception that the LP 40 was replaced with LP 100. The CaCO3 was replaced with Feldspar and a 1% of a light stabilizer and UV absorber was added. LP 100 has basically the same composition as LV 40 but results in better pigmentation. A flat panel mold was employed and the panels produced are being tested for the effects of sunlight on the plant roof.

EXAMPLE III

A gel coating composition was formulated using the following ingredients.

| Composition | Parts |
| --- | --- |
| Resilient polyester (maleic anhydride, isophthalic anhydride, ethylene glycol and diethylene glycol) | 70 |
| 66 parts of rigid vinyl ester resin (copolymer of acrylic acid and the diglycidylether of Bisphenol A[1], acetate) dissolved in 44 parts styrene. | 110 |
| Thermoplastic styrene-butadiene copolymer (purchased from Dow) | 44.4 |
| Styrene monomer | 79.6 |
| Tert-butyl perbenzoate | 2 |
| Tert.-butyl peroctoate | 2 |
| Dialkyl phosphate (ZELEC UN) DuPont mold release agent | 1.375 |
| Feldspar (anhydrous sodium, potassium aluminum slicate) 5% Na 8% K | 265 |

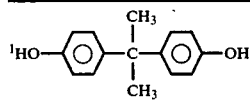

A series of 12 Oldsmobile hoods having an upper surface area of 2.3 square meters were formed of conventional Rohm and Haas based SMC and coated with the above formulation. The hoods were cured for about four minutes prior to the gel coating. The gel coat was cured for about ½ minute. Most of the surface imperfections present in the uncoated hoods were corrected by the coating. The coating did not possess good adhesion to the substrate and even poorer adhesion to other conventional SMC substrates.

In order to determine the effects of cure time of the substrate on adhesion, substrate cure times of 45 sec., 1 min., 1½ min. and 3½ min. (prior to applying the coating) were employed. The substrate was molded sheet. The coating cure time was 3½ min. with a mold temperature of 300° F. in all cases. The adhesion was very good at substrate cure times of 45 seconds, 1 minute and 1½ minute and poor at 3½ minutes.

EXAMPLE III b

The Feldspar was replaced with calcium carbonate with the same results as those obtained in Example IIIa.

Example IV

Conductive coating compositions used in the practice of the present invention have the following formulations:

| Components | Parts | Parts |
| --- | --- | --- |
| Vinyl ester resin[1] in styrene (believed to be 66% copolymer of acrylic acid and diglycidyl ether of bisphenol A in 44% styrene) | 400 | 400 |
| 40% polyvinyl acetate dissolved in 60% styrene[2] | 120 | 120 |
| Petroleum coke (finely ground) | 480 | 600 |
| Coak Coke (finely ground) | | 600 |
| Tertiary butyl peroctoate | 6 | |
| Saturated solution of parabenzoquinon in styrene (inhibitor) | 0-.8 | 0-.8 |
| Styrene | 0-40 | 0-40 |
| Dialkyl phosphate[3] (mold release) | 4 | 4 |

[1]Dow XD 9013.01
[2]Union Carbide LP 40
[3]Zelac NE DuPont

The inhibitor and styrene levels are varied to control the flow and gel time of the composition. Generally, large parts have longer flow times. The The coating compositions as outlined above have good conductivity. The conductive surface allows roof parts to be chrome-plated preventing heat build-up in the passenger compartment. The conductive surface on a hood reduces static radio interference. The entire body can also be made conductive so that it can be electrostatically painted.

The conductive filler can be present at from a small but effective amount to impart conductivity to a lever of 300 parts per 100 parts of vinyl ester resin.

The calculation throughout include only the vinyl ester and not the monomeric styrene present in the so-called vinyl ester resin.

I claim:

1. In a method of coating a rigid automotive part made from sheet moulding compound, after the part is formed between two mold halves and cured, by the injection of the coating composition into a space formed by separating one of the mold halves from the part while maintaining the mold in a sealed condition and then curing the coating composition, the improvement characterized by the coating composition consisting essentially of vinyl ester resin formed by the reaction of a polyepoxide resin with an unsaturated monocarboxylic acid.

2. The method of claim 1 wherein the polyepoxide resin is the diglycidyl ether of the compound

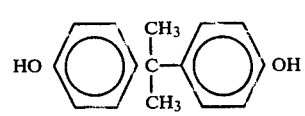

3. The product produced by the method of claim 1.

* * * * *